United States Patent
Kwun et al.

(10) Patent No.: US 8,019,345 B2
(45) Date of Patent: Sep. 13, 2011

(54) APPARATUS AND METHOD FOR PERFORMING HANDOVER IN BROADBAND WIRELESS COMMUNICATION SYSTEM

(75) Inventors: Jong-Hyung Kwun, Suongnam-si (KR); Young-Hyun Jeon, Guri-si (KR); Hyun-Soo Yoon, Daejeon (KR); Han-Jin Lee, Seoul (KR); Dong-Wook Kim, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 925 days.

(21) Appl. No.: 11/985,514

(22) Filed: Nov. 15, 2007

(65) Prior Publication Data

US 2008/0119182 A1    May 22, 2008

(30) Foreign Application Priority Data

Nov. 17, 2006    (KR) .................. 10-2006-0113617

(51) Int. Cl.
*H04W 88/02* (2009.01)
(52) U.S. Cl. .......................................... 455/439
(58) Field of Classification Search .............. 455/456.1, 455/67.11, 436, 439, 562.1, 70, 423, 437, 455/438, 440, 443, 446, 450; 370/210, 252, 370/315, 328, 331, 332, 338, 350; 235/472.01; 725/87

See application file for complete search history.

(56) References Cited

U.S. PATENT DOCUMENTS

| | | | |
|---|---|---|---|
| 5,490,165 A * | 2/1996 | Blakeney et al. | 370/335 |
| 6,445,917 B1 * | 9/2002 | Bark et al. | 455/423 |
| 6,826,161 B1 * | 11/2004 | Shahidi et al. | 370/331 |
| 2002/0102977 A1 | 8/2002 | Shi | |
| 2005/0288018 A1 | 12/2005 | Huang et al. | |
| 2008/0096564 A1 * | 4/2008 | Jung et al. | 455/436 |
| 2008/0298292 A1 * | 12/2008 | Jang | 370/311 |
| 2010/0113032 A1 * | 5/2010 | Lee et al. | 455/437 |

FOREIGN PATENT DOCUMENTS

| | | |
|---|---|---|
| KR | 2001-0080730 | 8/2001 |
| KR | 2001-0082362 | 8/2001 |
| WO | WO 00/38455 A1 | 6/2000 |
| WO | WO 00/38456 A1 | 6/2000 |

* cited by examiner

*Primary Examiner* — Diane Mizrahi

(57) ABSTRACT

An apparatus and method for performing a handover in a broadband wireless communication system is provided. In the broadband wireless communication system, a base station includes: a grouping unit for grouping mobile stations by using information on a movement path of each mobile station and information on a received signal strength of a neighboring base station, thereby constituting at least one group; a controller for modifying hystereses of remaining mobile stations among the mobile stations belonging to the same group, if a predetermined number of mobile stations perform handovers; and a transmitter for transmitting a message including modified hysteresis information to the remaining mobile stations belonging to the group.

24 Claims, 11 Drawing Sheets

APPARATUS AND METHOD FOR PERFORMING HANDOVER IN BROADBAND WIRELESS COMMUNICATION SYSTEM

CROSS-REFERENCE TO RELATED APPLICATION(S) AND CLAIM OF PRIORITY

This application claims the benefit under 35 U.S.C. §119(a) of Korean patent application filed in the Korean Intellectual Property Office on Nov. 17, 2006 and assigned Serial No. 2006-113617, the entire disclosure of which is hereby incorporated by reference.

TECHNICAL FIELD OF THE INVENTION

The present invention relates to an apparatus and method for performing a handover in a broadband wireless communication system. More particularly, the present invention relates to an apparatus and method for controlling a handover hysteresis in a broadband wireless communication system.

BACKGROUND OF THE INVENTION

In a cellular-based wireless communication system, a mobile station (MS) performs a handover whenever moving from one cell to another, thereby maintaining seamless communication while moving. That is, the mobile station measures channel states with respect to a serving base station (BS) and a neighboring base station, and, if the neighboring BS provides a superior channel state to the serving base station, performs a handover to the neighboring base station. It is desirable in this case that the handover is performed at a moment when the channel state (i.e., a received signal strength) of the neighboring base station becomes greater than a received signal strength of the serving base station. However, when the mobile station is located in a cell boundary area, the received signal strength of the serving base station may temporarily decrease under the influence of channel fading or interference. Therefore, if the handover is performed at a moment when the received signal strengths of the two base stations become equal to each other, at a similar time, the mobile station may perform a handover again. This phenomenon is referred to as a ping-pong effect.

In order to reduce the ping-pong effect, the mobile station uses a hysteresis value (i.e., threshold) in a process of comparing received signal strengths. That is, the mobile station performs a handover at a time when a difference between the received signal strength of the neighboring base station and the received signal strength of the serving base station reaches the hysteresis value. In general, the hysteresis value is a fixed value.

As described above, in a broadband wireless communication system, a mobile station performs a handover by using a fixed hysteresis value. The use of the hysteresis value results in the decrease in the ping-pong effect, but produces a handover delay. In particular, communication is disrupted due to the handover delay when the mobile station moves fast. In addition, there is a problem in that an overall system capacity decreases since communication is continued with a serving base station having a relatively low received signal strength. Therefore, there is a need for a method for controlling a hysteresis according to an environment of a mobile station.

SUMMARY OF THE INVENTION

To address the above-discussed deficiencies of the prior art, it is a primary aspect of the present invention to address at least the above-mentioned problems and/or disadvantages and to provide at least the advantages described below. Accordingly, an aspect of the present invention is to provide an apparatus and method for reducing a handover delay caused by a handover hysteresis in a broadband wireless communication system.

Another aspect of the present invention is to provide an apparatus and method for controlling a handover hysteresis by predicting a movement path of a mobile station in a broadband wireless communication system.

Another aspect of the present invention is to provide an apparatus and method for grouping mobile stations moving along the same path and for controlling hystereses of mobile stations belonging to the same group in a broadband wireless communication system.

According to an aspect of the present invention, a base station (BS) apparatus in a broadband wireless communication system is provided. The apparatus includes: a grouping unit for grouping mobile stations by using information on a movement path of each mobile station (MS) and information on a received signal strength of a neighboring base station, thereby constituting at least one group; a controller for modifying hystereses of remaining mobile stations among the mobile stations belonging to the same group, if a predetermined number of mobile stations perform handovers; and a transmitter for transmitting a message including modified hysteresis information to the remaining mobile stations belonging to the group.

According to another aspect of the present invention, a mobile station (MS) apparatus in a broadband wireless communication system is provided. The apparatus includes: a receiver for receiving a message including modified hysteresis information from a base station; and a handover processor for performing a handover if a received signal strength difference between a serving base station and a neighboring base station is greater than the modified hysteresis.

According to another aspect of the present invention, a method performed by a base station for controlling a handover hysteresis of a mobile station in a broadband wireless communication system is provided. The method includes the steps of: grouping mobile stations by using information on a movement path of each mobile station and information on a received signal strength of a neighboring base station, thereby constituting at least one group; modifying hystereses of remaining mobile stations among the mobile stations belonging to the same group, if a predetermined number of mobile stations perform handovers; and transmitting a message including modified hysteresis information to the remaining mobile stations belonging to the group.

According to another aspect of the present invention, a method of controlling a handover hysteresis by a mobile station in a broadband wireless communication system is provided. The method includes the steps of: receiving a message including modified hysteresis information from a base station; modifying a hysteresis according to the information; checking whether a received signal strength difference between a serving base station and a neighboring base station is greater than the modified hysteresis; and performing a handover if the received signal strength difference is greater than the modified hysteresis.

According to another aspect of the present invention, a method performed by a base station for grouping mobile stations moving along the same path in a broadband wireless communication system is provided. The method includes the steps of: performing first grouping by computing a movement path correlation between the mobile stations according to a movement path; and performing second grouping on the mobile stations, which have undergone the first grouping, by computing a signal strength correlation between the mobile stations according to a received signal strength.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:111

DETAILED DESCRIPTION OF THE INVENTION

FIGS. 1 through 9B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Hereinafter, a technique of the present invention will be described in which a movement path of a mobile station (MS) is predicted, and a handover hysteresis of the mobile station is controlled in a broadband wireless communication system. Although an Orthogonal Frequency Division Multiplexing (OFDM)-based wireless communication system will be described in the following descriptions, this is for explanation purpose only. Thus, the present invention may also apply to other cellular-based wireless communication systems.

A technique of the present invention will be first described in brief.

Figure 1:
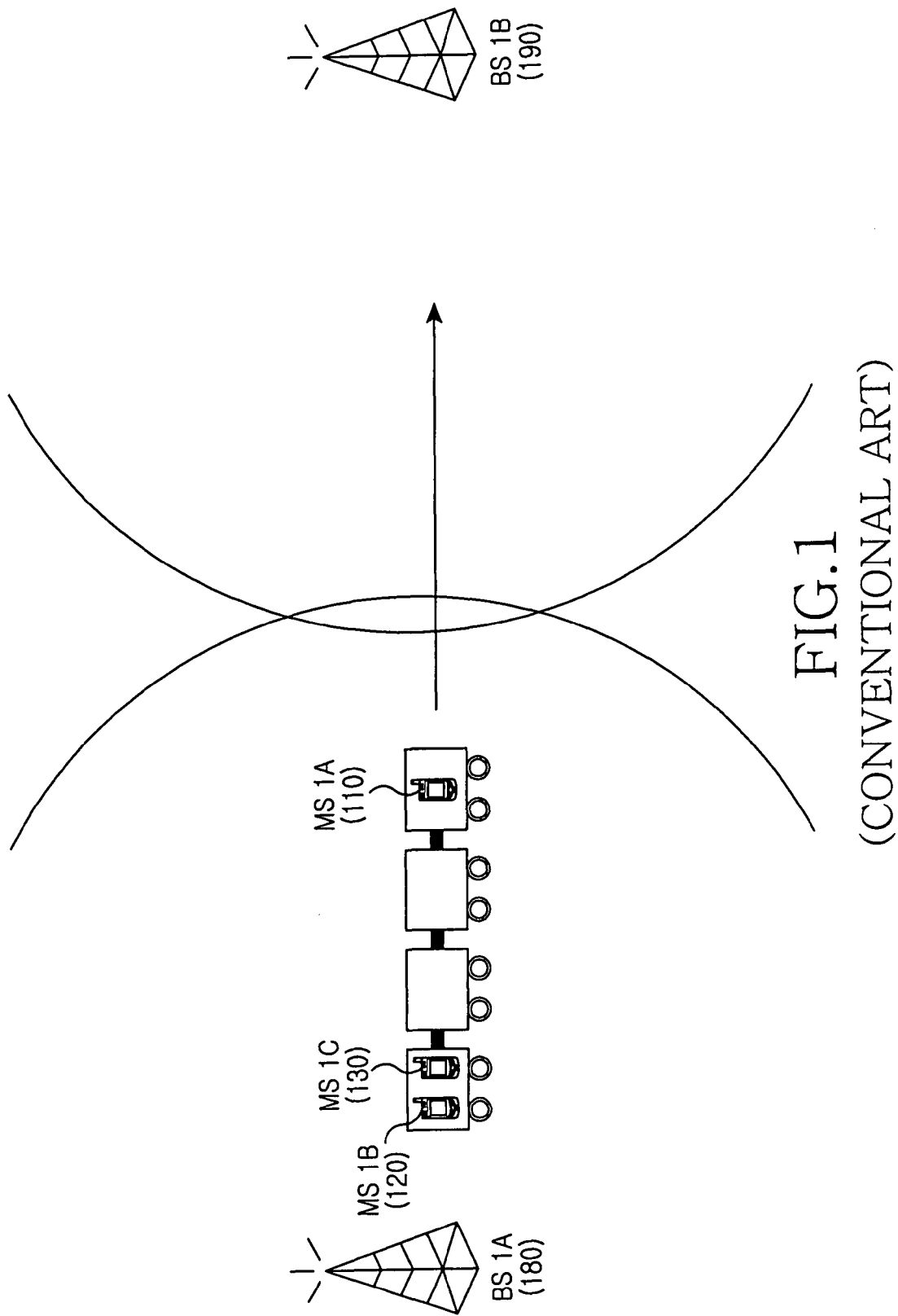
FIG. 1 is a schematic view illustrating Mobile Stations (mobile stations) which move between cells in a conventional broadband wireless communication system.

FIG. 1 is a schematic view illustrating mobile stations which move between cells in a broadband wireless communication system.

Referring to FIG. 1, a mobile station (MS) 1A (110), a mobile station (MS) 1B (120), and a mobile station (MS) 1C (130) move while being loaded on the same train. In this case, if the train moves from a base station (BS) 1A (180) to a base station (BS) 1B (190), the MS1A 110 which is nearest to the BS1B 190 first performs a handover. Predictably, at a similar time, the MS1B 120 and the MS1C 130 also have to perform handovers.

Figure 2:
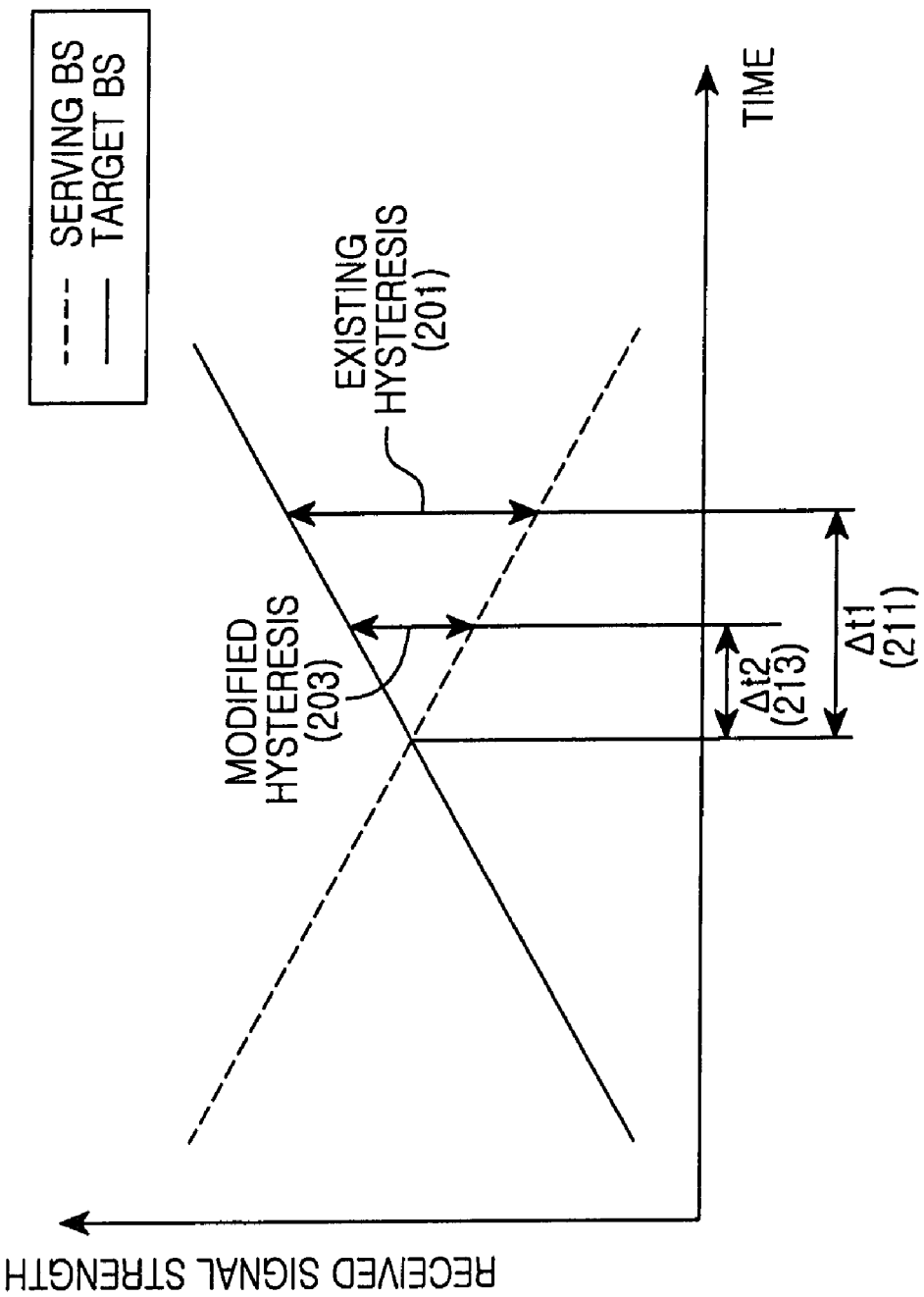
FIG. 2 is a graph illustrating a handover time based on a hysteresis in a broadband wireless communication system according to the present invention.
Figure 3:
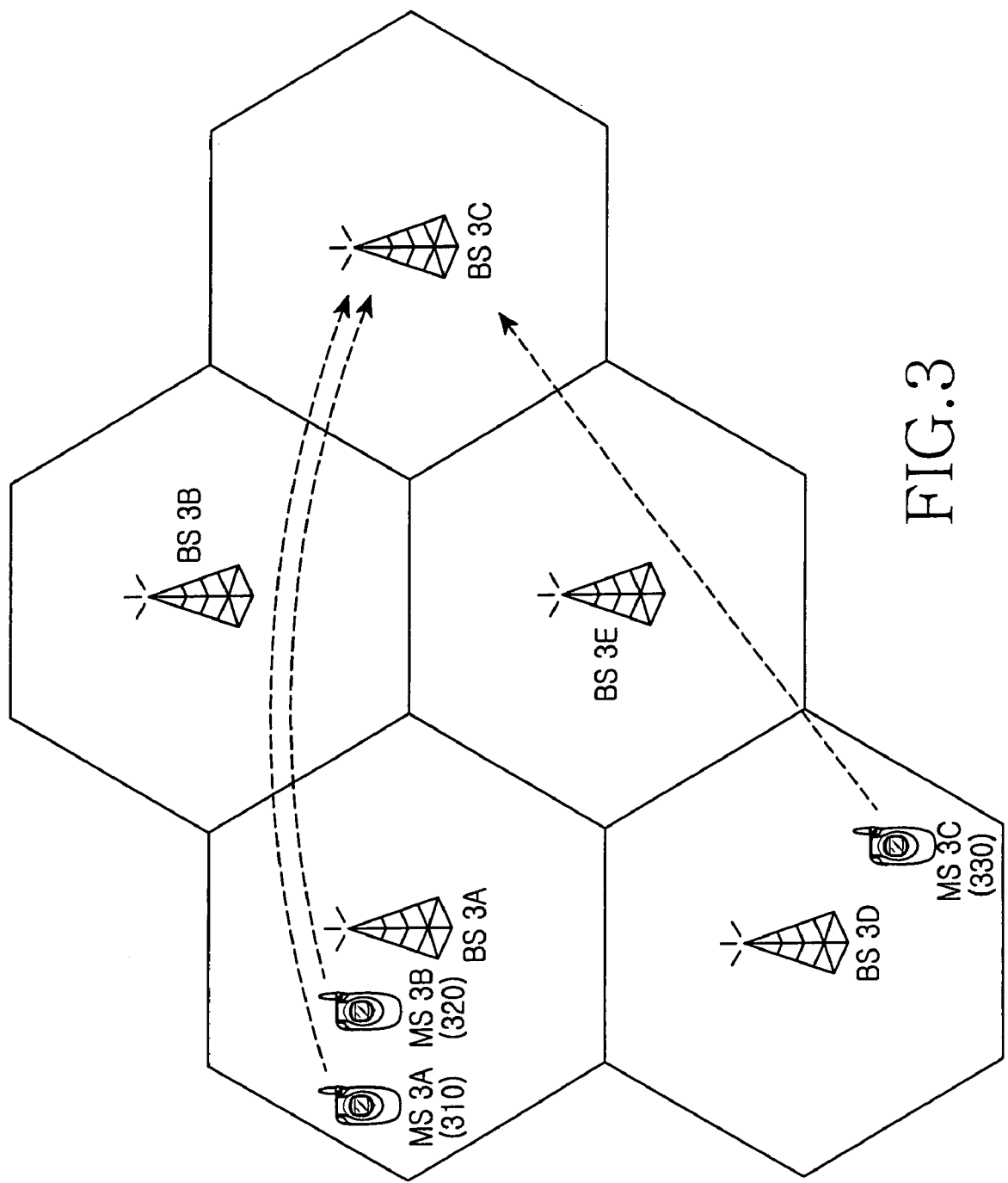
FIG. 3 is a view illustrating a predicted movement path depending on a history of mobile stations in a broadband wireless communication system according to the present invention.

If hystereses of the MS1B 120 and the MS1C 130 decrease at a time when the MS1A 110 performs the handover, a time required for the MS1B 120 and the MS1C 130 to maintain communication with a BS having a relatively low received signal strength is reduced. For example, as shown in FIG. 2, when using an existing hysteresis 201, an MS maintains communication with a BS having a low received signal strength for a time period (i.e., $\Delta t1$) 211. In addition, when using a modified hysteresis 203, the MS maintains communication with the BS having the low received signal strength for a time period (i.e., $\Delta t2$) 213.

That is, in the technique of the present invention, mobile stations moving along the same movement path are grouped into a group. Thus, when at least one MS belonging to the group performs a handover, there is a decrease in handover hystereses of remaining mobile stations of the group.

Now, information used for grouping mobile stations and a reason of using the information will be described according to the present invention.

A grouping process is performed so that mobile stations moving along a similar movement path can be classified into one group. The grouping process is performed in two steps. Information used in the first step is in regards to a history of an MS, that is, a sequential list of BSs that have provided services to the MS. If a plurality of mobile stations have been received services from the same BS at a similar time, it is regarded that movement paths are correlated with each other. For example, in FIG. 3, an MS3A 310 and an MS3B 320 move together since the MS3A 310 and the MS3B 320 have received services from the same BS at a similar time. However, an MS3C 330 moves independently from the MS3A 310 and the MS3B 320 since the MS3C 330 has received a service from a different BS. A BS performing the grouping process can recognize history information of the mobile stations through communication between BSs.

Figure 4A:
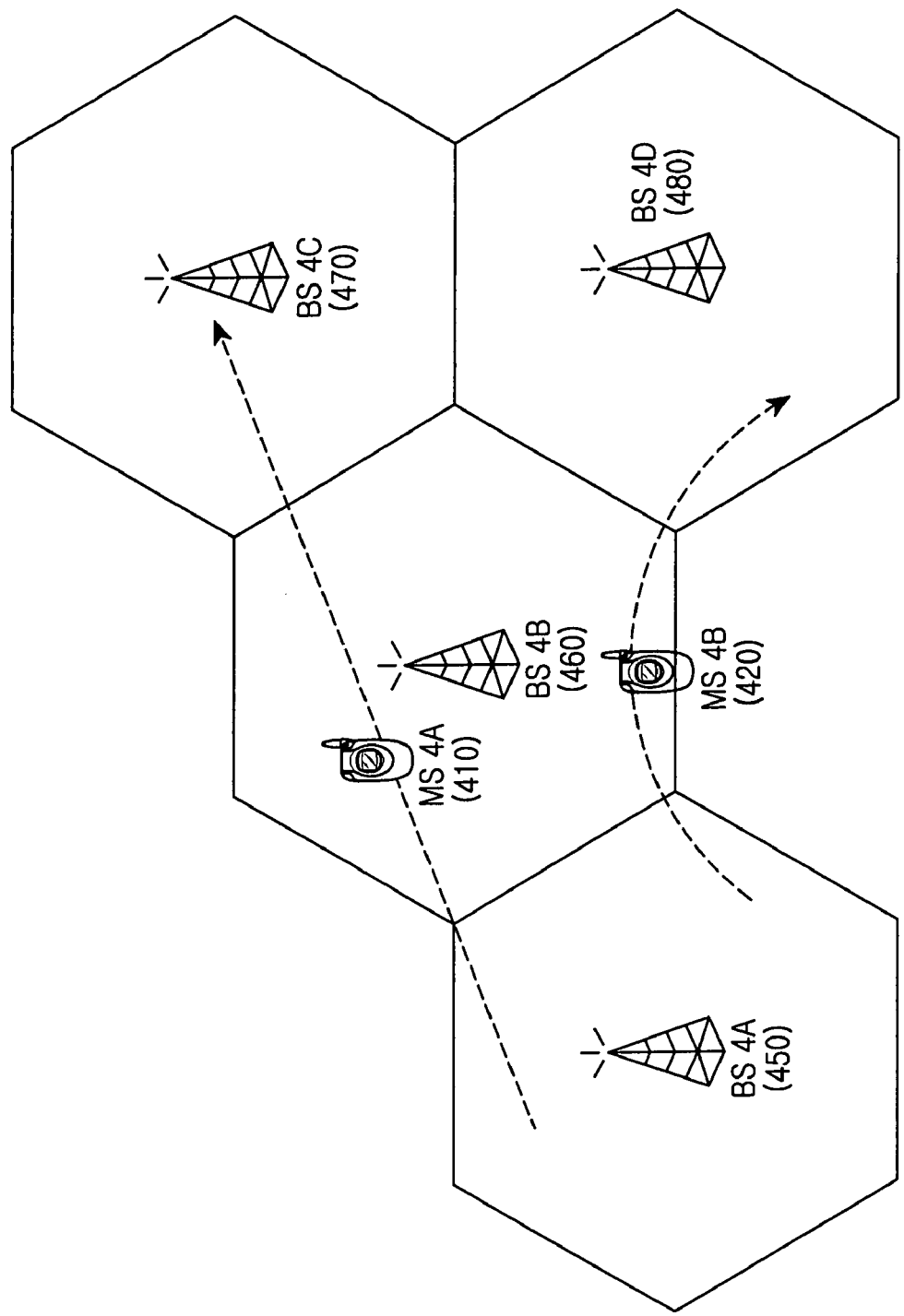
FIGS. 4A and 4B are views illustrating a movement path of an MS and a received signal strength in a broadband wireless communication system according to the present invention.
Figure 4B:
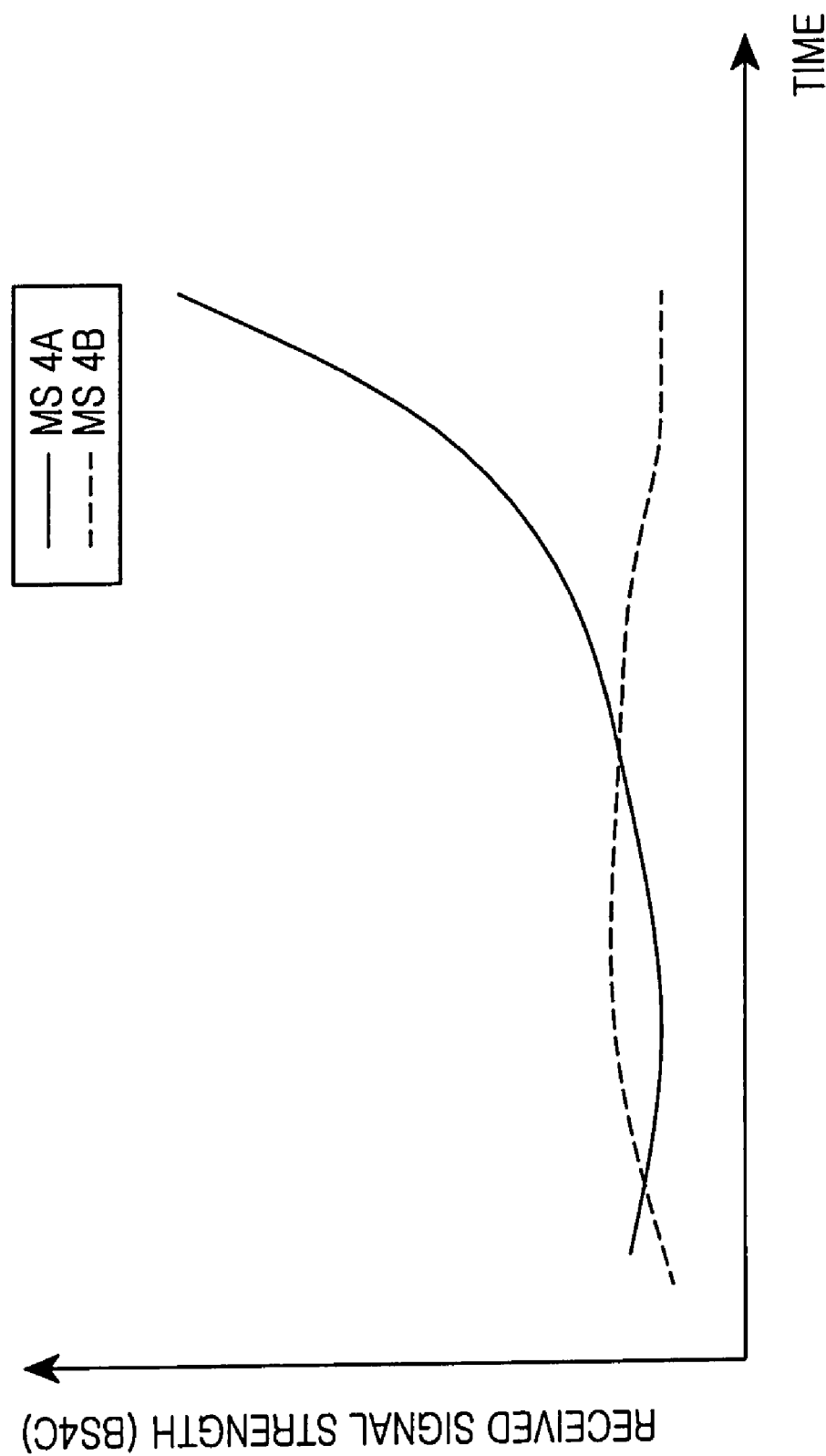

However, the grouping using only the history information may be inaccurate. Thus, the second step of the grouping process is performed to compensate for the grouping performed based on the history information. For example, in FIG. 4A, while an MS4A 410 and an MS4B 420 receive services from a BS4A 450 and a BS4B 460, the MS4A 410 and the MS4B 420 move towards a BS4C 470 and a BS4D 480, respectively. That is, at a moment when the MS4A 410 and the MS4B 420 receive the services from the BS4B 460, although the MS4A 410 and the MS4B 420 belong to the same group as a result of the grouping performed by using the history information, the MS4A 410 and the MS4B 420 do not move along the same path in practice. Therefore, information used in the second step is in regards to a received signal strength of a neighboring BS belonging to an active set. FIG. 4B is a graph showing received signal strengths of the MS4A 410 and the MS4B 420 with respect to the BS4C 470 as shown in FIG. 4A. That is, regarding the MS4A 410, a received signal strength with respect to the BS4C 470 increases, and regarding the MS4B 420, a received signal strength with respect to the BS4C 470 decreases. Therefore, the grouping process can be further accurately performed when a BS performing the grouping process uses a received signal strength of a neighboring BS that is adjacent to each MS.

Now, structures and operations of a BS and an MS according to the present invention will be described with reference to the accompanying drawings.

Figure 5:
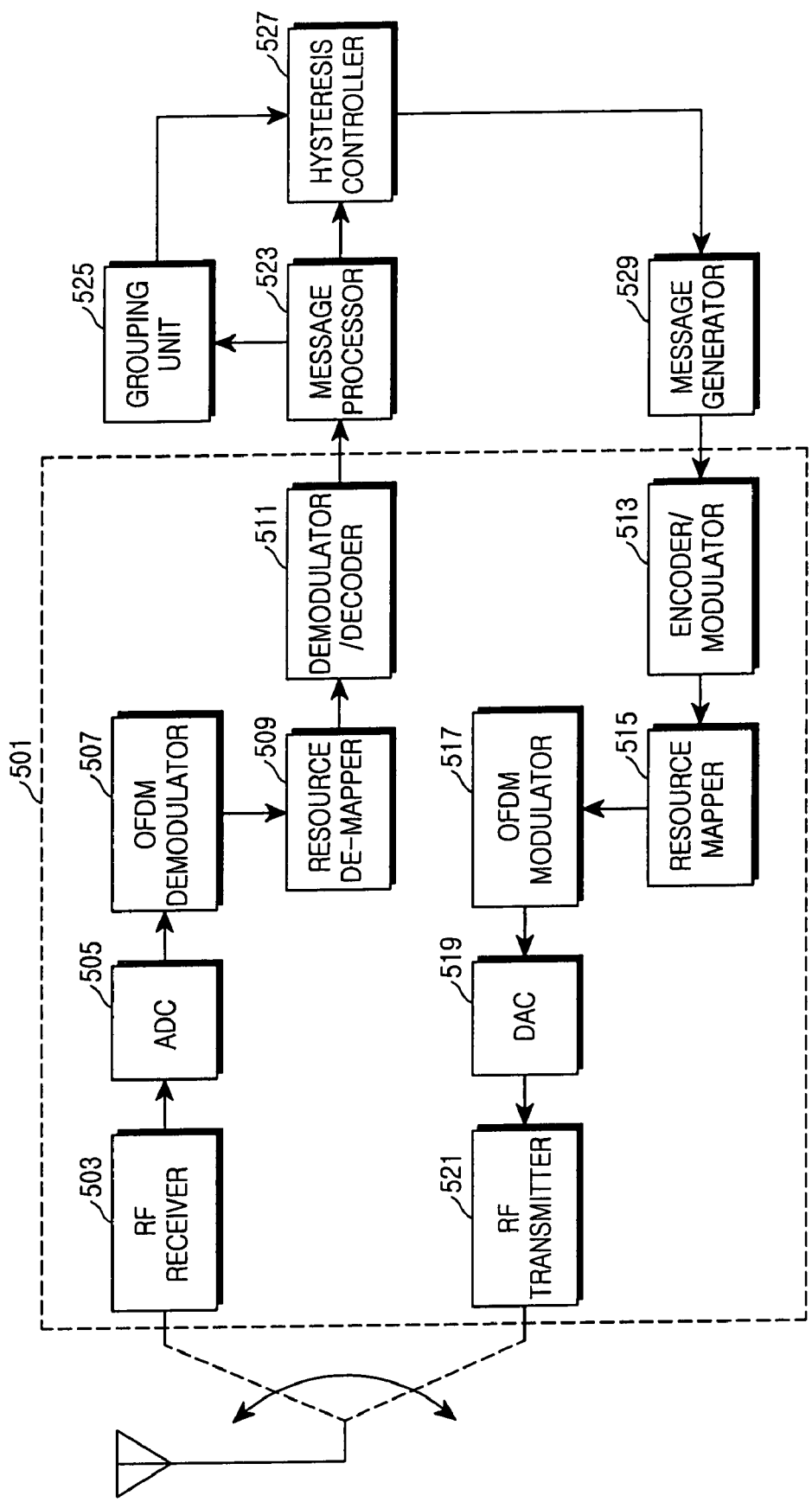
FIG. 5 is a block diagram illustrating a structure of a Base Station (BS) in a broadband wireless communication system according to the present invention.

FIG. 5 is a block diagram illustrating a structure of a BS in a broadband wireless communication system according to the present invention.

Referring to FIG. 5, the BS includes a wireless communication unit 501, a message processor 523, a grouping unit 525, a hysteresis controller 527, and a message generator 529.

The wireless communication unit 501 performs signal processing for transmitting/receiving data through a wireless channel. The wireless communication unit 501 includes a Radio Frequency (RF) receiver 503, an Analog to Digital Converter (ADC) 505, an OFDM demodulator 507, a resource de-mapper 509, a demodulator/decoder 511, an encoder/modulator 513, a resource mapper 515, an OFDM modulator 517, a Digital to Analog Converter (DAC) 519, and an RF transmitter 521.

The RF receiver 503 converts an RF signal received through an antenna into a baseband analog signal. The ADC 505 converts the analog signal provided from the RF receiver 503 into a digital signal. The OFDM demodulator 507 performs a Fast Fourier Transform (FFT) operation on the time-domain signal provided from the ADC 505 and thus outputs a frequency-domain signal. The resource de-mapper 509 reconstructs the frequency-domain signal provided from the OFDM demodulator 507 so that the signal is restored to have a format before mapping. The demodulator/decoder 511 demodulates and decodes the signal provided from the resource de-mapper 509 according to a predetermined method and then outputs an information bit-stream.

The encoder/modulator 513 encodes and modulates the information bit-stream according to a predetermined method and then outputs a complex symbol signal. The resource mapper 515 maps the signal provided from the encoder/modulator 513 into a corresponding sub-carrier. The OFDM modulator 517 performs an Inverse FFT (IFFT) operation on the signal provided from the resource mapper 515 and thus outputs a time-domain signal. The DAC 519 converts the digital signal provided from the OFDM modulator 517 into an analog signal. The RF transmitter 521 converts the baseband analog signal provided from the DAC 519 into an RF signal and then transmits the RF signal through the antenna.

The message processor 523 evaluates content of a message received from an MS by using the information bit-stream provided from the demodulator/decoder 511. In particular, according to the present invention, when the message received from the MS includes received signal strength information of a neighboring BS, the received signal strength information is provided to the grouping unit 525. In addition, when a message for performing a handover is received from the MS, information on the MS performing the handover and hysteresis information used by the MS to perform the handover are provided to the hysteresis controller 527. The received signal strength information of the neighboring BS is received from the MS every predetermined time period Ts, and contains a predetermined number Ns of pieces of measurement information.

The grouping unit 525 groups a plurality of mobile stations moving along the same movement path. That is, as described above, two steps of grouping are performed (i.e., first grouping and second grouping). To perform the first grouping, the grouping unit 525 first computes a distance coefficient between mobile stations located within a cell by using Equation 1 below.

$$D_{i,j}(t) = \begin{cases} 0, & R_i(t) = R_j(t) \\ 1, & \text{else} \quad R_i(t) \text{ is adjacent to } R_j(t). \\ \infty, & \text{otherwise} \end{cases} \quad [\text{Eqn. 1}]$$

In Equation 1, $D_{i,j}(t)$ denotes a distance coefficient between an MSi and an MSj at time t, and $R_i(t)$ denotes an index of a BS from which the MSi receives a service at time t.

That is, by referencing to history information, at time t, the grouping unit 525 sets a distance coefficient to 0 if two mobile stations have the same BS index, and sets the distance coefficient to 1 if the BS indices of the two mobile stations are equal to indices of neighboring BSs. Otherwise, the grouping unit 525 determines that movement paths of the two mobile stations are not correlated, and thus sets the distance coefficient to an infinite value.

After a distance coefficient between mobile stations at a specific time is computed by using Equation 1 above, and the grouping unit 525 computes a movement path correlation between mobile stations by using Equation 2 below.

$$C_{i,j}(t) = \frac{\sum_{n=1}^{N_B} D_{i,j}(t - T_B(n-1))}{N_B}. \quad [\text{Eqn. 2}]$$

In Equation 2, $C_{i,j}(t)$ denotes a movement path correlation. $N_B$ denotes the number of BS indices used to compute the movement path correlation, that is, a variable value indicating a length of history to be referenced. $D_{i,j}$ denotes a result of Equation 1 above. $T_B$ denotes a time period in which a history is recorded.

That is, if the predetermined number $N_B$ of distance coefficients are averaged with respect to the two mobile stations, in the case of the mobile stations moving along the same movement path, a result $C_{i,j}(t)$ of Equation 2 becomes close to zero. Therefore, if the result $C_{i,j}(t)$ of Equation 2 is less than a specific threshold, the mobile stations are classified into the same group.

Furthermore, the grouping unit 525 receives the received signal strength information of neighboring BSs, which are adjacent to the mobile stations, from the message processor 523, and then performs the second grouping. To perform the second grouping, the grouping unit 525 obtains a correlation depending on a received signal strength by using Equation 3 below.

$$G_{i,j}(t) = \frac{\sum_{A \in ActiveSet} \left| \sum_{n=1}^{N_S} [S_{i,A}(t - T_S(n-1)) - S_{j,A}(t - T_S(n-1))] \right|}{N_S \cdot N_{ActiveSet}}. \quad [\text{Eqn. 3}]$$

In Equation 3, $G_{i,j}(t)$ denotes a signal strength correlation between an MSi and an MSj at time t. $S_{i,A}(t)$ denotes a received signal strength of an Ath BS, computed by the MSi at time t. $T_S$ denotes a time period in which an MS obtains received signal strength information of a neighboring BS. $N_S$ denotes the number of pieces of received signal strength information transmitted by an MS for one time period.

That is, in the case of two mobile stations moving along the same movement path, a difference of received signal strengths of neighboring BSs of the two mobile stations are averaged to obtain the predetermined number $N_S$ of pieces of information, and thus obtained values are averaged for all BSs belonging to an active set. Then, a result $G_{i,j}(t)$ of Equation (3) becomes close to zero. As a result, regarding the two mobile stations belonging to a group resulted from the first grouping, if the result $G_{i,j}(t)$ of Equation 3 is less than a specific threshold, the two mobile stations are finally classified into the same group.

In other words, the grouping unit 525 performs grouping by receiving history information of the mobile stations and received signal strength information of a neighboring BS, and then provides the grouping result to the hysteresis controller 527.

The hysteresis controller 527 manages hystereses of mobile stations. In particular, according to the present invention, when N mobile stations belonging to one group perform handovers, the hysteresis controller 527 controls hystereses of remaining mobile stations belonging to the same group in which the mobile stations performing the handover are included. In addition, the hysteresis controller 527 provides the message generator 529 with target BS information, modified hysteresis information, and modified hysteresis valid time $T_{HO}$ information. The modified hysteresis valid time $T_{HO}$ information is used to reset the modified hysteresis to the existing hysteresis when one of the remaining mobile stations deviates from a predicted movement path, that is, when a handover is not performed even when a specific time elapses after the hysteresis is modified.

The message generator 529 generates a message to be transmitted to the mobile stations. In particular, according to the present invention, the message generator 529 generates a message including the target BS information, the modified hysteresis information, and the modified hysteresis valid time $T_{HO}$ information provided from the hysteresis controller 527, and transmits the message to the encoder/modulator 513.

Figure 6:
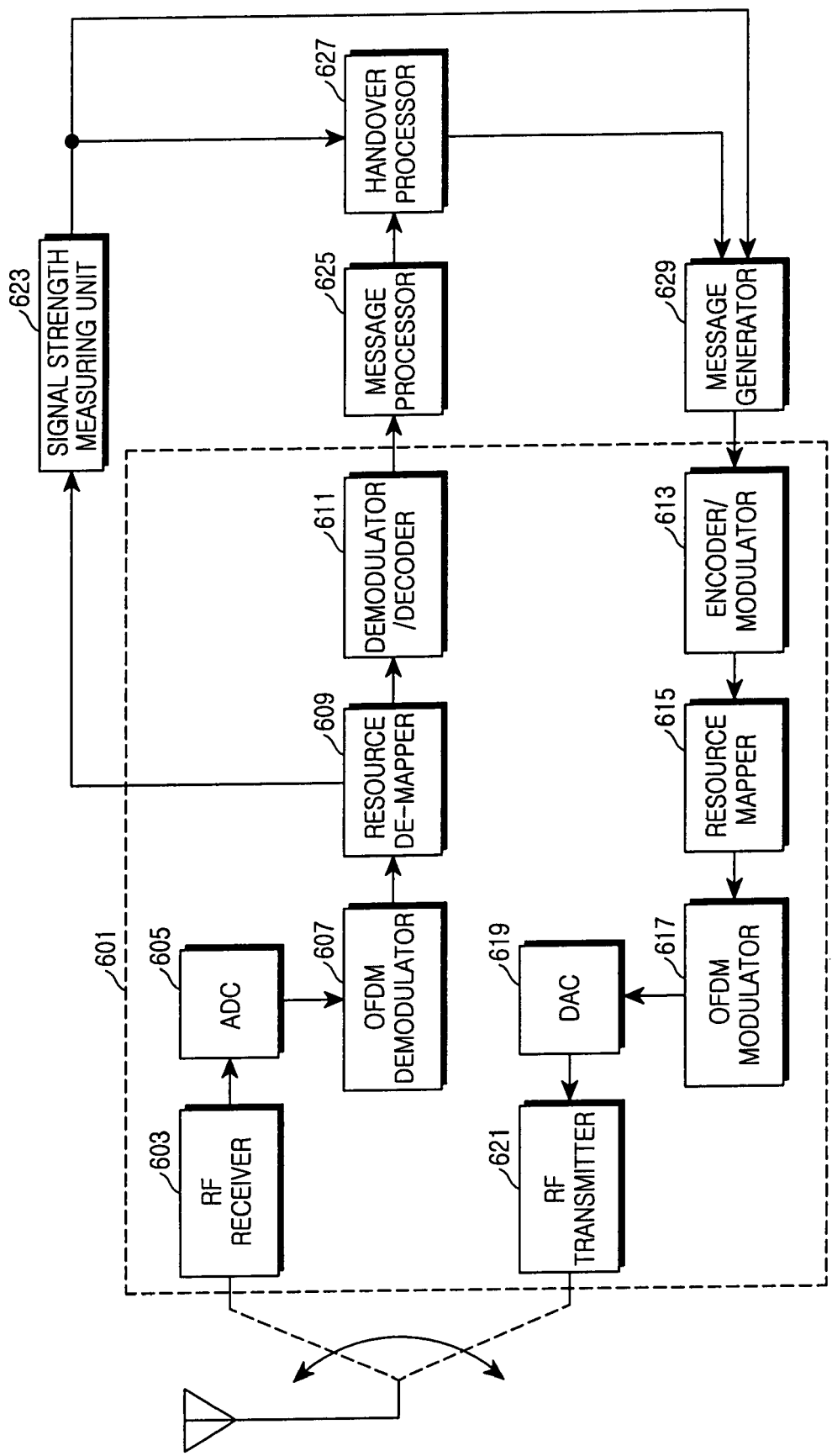
FIG. 6 is a block diagram illustrating a structure of an MS in a broadband wireless communication system according to the present invention.

FIG. 6 is a block diagram illustrating a structure of an MS in a broadband wireless communication system according to the present invention.

Referring to FIG. 6, the MS includes a wireless communication unit 601, a signal strength measuring unit 623, a message processor 625, a handover processor 627, and a message generator 629.

The wireless communication unit 601 performs signal processing for transmitting/receiving data through a wireless channel. The wireless communication unit 601 includes an RF receiver 603, an ADC 605, an OFDM demodulator 607, a resource de-mapper 609, a demodulator/decoder 611, an encoder/modulator 613, a resource mapper 615, an OFDM modulator 617, a DAC 619, and an RF transmitter 621.

The RF receiver 603 converts an RF signal received through an antenna into a baseband analog signal. The ADC 605 converts the analog signal provided from the RF receiver 603 into a digital signal.

The OFDM demodulator 607 performs an FFT operation on the time-domain signal provided from the ADC 605 and thus outputs a frequency-domain signal. The resource de-mapper 609 reconstructs the frequency-domain signal provided from the OFDM demodulator 607 so that the signal is restored to have a format before mapping. The resource de-mapper 609 extracts a pilot signal and outputs the pilot signal to the signal strength measuring unit 623. Further, the resource de-mapper 609 outputs an information signal to the demodulator/decoder 611. The demodulator/decoder 611 demodulates and decodes the signal provided from the resource de-mapper 609 according to a predetermined method and then outputs an information bit-stream.

The encoder/modulator 613 encodes and modulates the information bit-stream according to a predetermined method and then outputs a complex symbol signal. The resource mapper 615 maps the signal provided from the encoder/modulator 613 into a corresponding sub-carrier. The OFDM modulator 617 performs an Inverse FFT (IFFT) operation on the signal provided from the resource mapper 615 and thus outputs a time-domain signal. The DAC 619 converts the digital signal provided from the OFDM modulator 617 into an analog signal. The RF transmitter 621 converts the baseband analog signal provided from the DAC 619 into an RF signal and then transmits the RF signal through the antenna.

The signal strength measuring unit 623 estimates a channel state between a BS and the MS by using a signal received from the BS. Further, the signal strength measuring unit 623 measures received signal strengths of neighboring base stations belonging to an active set and then outputs the measurement result every predetermined time period Ts. The received signal strength output every predetermined time period Ts is an averaged value computed for the specific time period Ts. Thus, the received signal strength may be regarded as a value which is obtained by eliminating frequent changes in the received signal strength caused by fast fading. Furthermore, when the averaged time value is set to be longer than an averaged time used to measure a received signal strength for use in a handover, influence of slow fading is also eliminated as much as possible.

The message processor 625 evaluates content of a message received from a BS by using the information bit-stream provided from the demodulator/decoder 611. In particular, according to the present invention, the message processor 625 checks a message received from the BS to evaluate modified hysteresis information, target BS information, and modified hysteresis valid time $T_{HO}$ information, and then provides the evaluation result to the handover processor 627.

The handover processor 627 deals with a function for performing a handover. In particular, according to the present invention, when the modified hysteresis information, the target BS information, and the modified hysteresis valid time information are provided from the message processor 625, the handover processor 627 modifies a hysteresis according to the provided information, and, if a difference between a received signal strength of the target BS and a received signal strength of the serving BS becomes greater than the modified hysteresis, performs a function for performing a handover to the target BS. In addition, after the hysteresis is modified, if the modified hysteresis valid time $T_{HO}$ provided from the message processor 625 elapses, the handover processor 627 resets the hysteresis to a value before modification.

The message generator 629 generates a message to be transmitted to the base stations. In particular, according to the present invention, the message generator 629 periodically generates a message including received signal strength information of a neighboring BS and thus transmits the message to the encoder/modulator 613.

Figure 7:
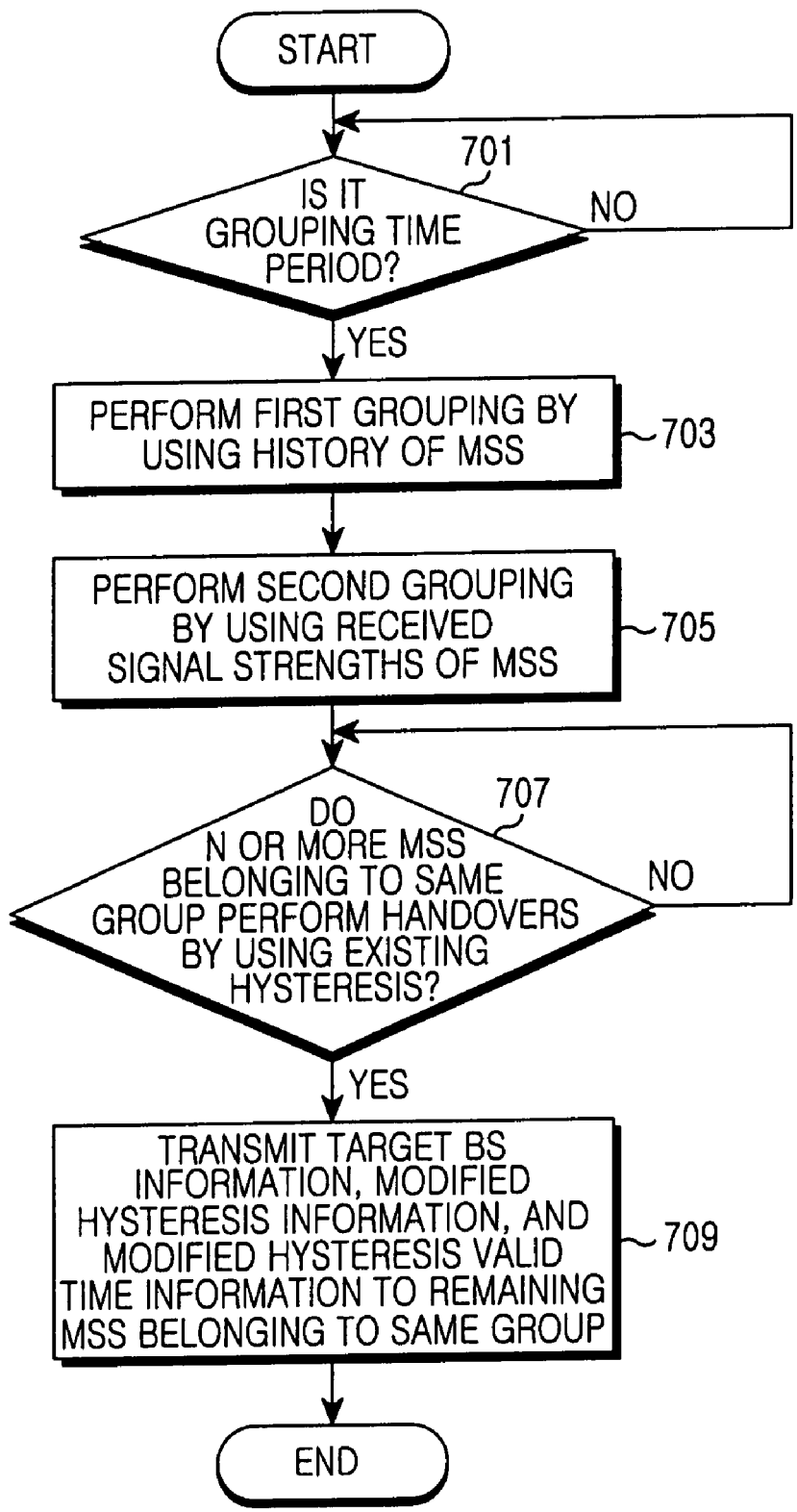
FIG. 7 is a flowchart illustrating a process in which a BS controls a handover hysteresis of an MS in a broadband wireless communication system according to the present invention.

FIG. 7 is a flowchart illustrating a process in which a BS controls a handover hysteresis of an MS in a broadband wireless communication system according to the present invention.

Referring to FIG. 7, the BS checks whether it is a grouping time period in step 701.

If it is the grouping time period, in step 703, the BS performs first grouping by using a history of mobile stations. That is, the BS computes a movement path correlation value $C_{i,j}(t)$ between the mobile stations by using Equation (1) and Equation (2) above, and thereafter classifies mobile stations, each of which a correlation value is less than a specific threshold, into one group.

After performing the first grouping, in step 705, the BS performs second grouping by using received signal strength information provided from the mobile stations. The received signal strength information indicates received signal strengths of neighboring base stations, which belong to an active set of a corresponding MS, and is measured by each MS. That is, the BS computes a signal strength correlation value $G_{i,j}(t)$ between the mobile stations by using Equation (3) above, and thereafter classifies again mobile stations, each of which belongs to a group resulted from the first grouping and has the correlation value $G_{i,j}(t)$ less than a specific threshold, into one group.

After performing the second groping, in step 707, the BS checks whether a predetermined number N of mobile stations belonging to the same group perform handovers by using an existing hysteresis. In other words, when an arbitrary MS performs a handover, the BS subsequently checks whether (N−1) mobile stations among the remaining mobile stations belonging to the same group perform handovers.

When N mobile stations belonging to the same group perform handovers, in step 709, the BS transmits modified hysteresis information, target BS information, and modified hysteresis valid time $T_{HO}$ information to remaining mobile stations which belong to the group and have not performed handovers.

Figure 8:
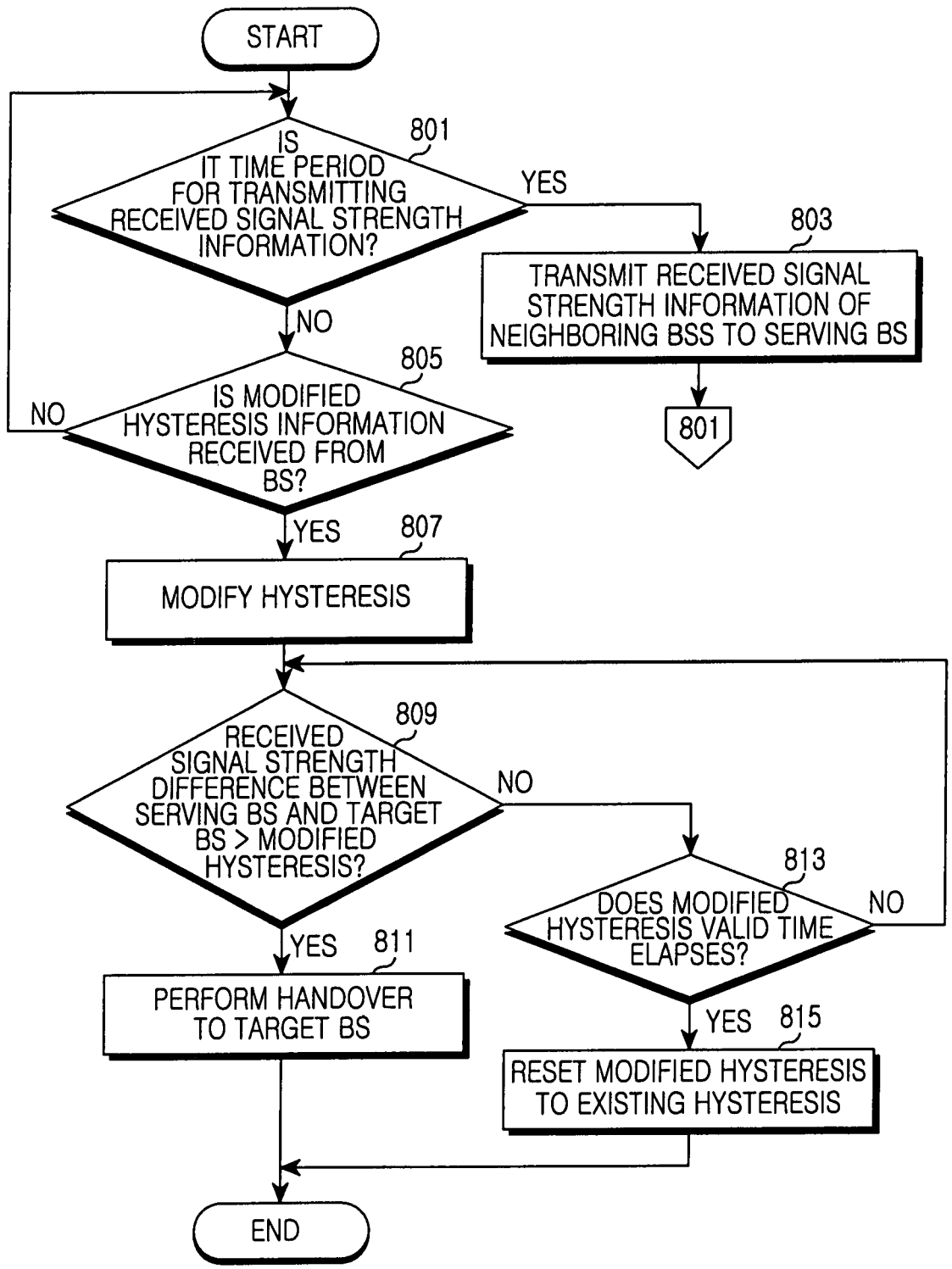
FIG. 8 is a flowchart illustrating a process in which an MS controls a handover hysteresis in a broadband wireless communication system according to the present invention.

FIG. 8 is a flowchart illustrating a process in which an MS controls a handover hysteresis in a broadband wireless communication system according to the present invention.

Referring to FIG. 8, the MS checks whether it is a time period for transmitting received signal strength information in step 801. The received signal strength information indicates information on received signal strengths of neighboring base stations belonging to an active set.

If it is the time period for transmitting the received signal strength information, in step 803, the MS transmits the received signal strength information of the neighboring base stations to a serving BS. The transmitted received signal strength information is an averaged value computed for the time period. Thus, the received signal strength may be regarded as a value which is obtained by eliminating frequent changes in the received signal strength caused by fast fading. Furthermore, when the averaged time value is set to be longer than an averaged time used to measure a received signal strength for use in a handover, influence of slow fading is also eliminated as much as possible.

On the other hand, if it is not the time period for transmitting the received signal strength information, in step 805, the MS checks whether modified hysteresis information is received from the serving BS. In this case, target BS information and modified hysteresis valid time $T_{HO}$ information are also received along with the modified hysteresis information.

Upon receiving the modified hysteresis information, in step 807, the MS modifies a hysteresis according to the received information.

After modifying the hysteresis, in step 809, the MS compares the modified hysteresis with a received signal strength difference between the serving BS and the target BS. This step is performed only when the received signal strength of the target BS is greater than that of the serving BS.

If the received signal strength difference is greater than the modified hysteresis, in step 811, the MS performs a handover to the target BS.

On the other hand, if the modified hysteresis is greater than the received signal strength difference, in step 813, the MS checks whether the modified hysteresis valid time $T_{HO}$ elapses.

If the modified hysteresis valid time $T_{HO}$ elapses, in step 815, the MS resets the hysteresis that is modified in step 807 to a value before modification.

Figure 9A:
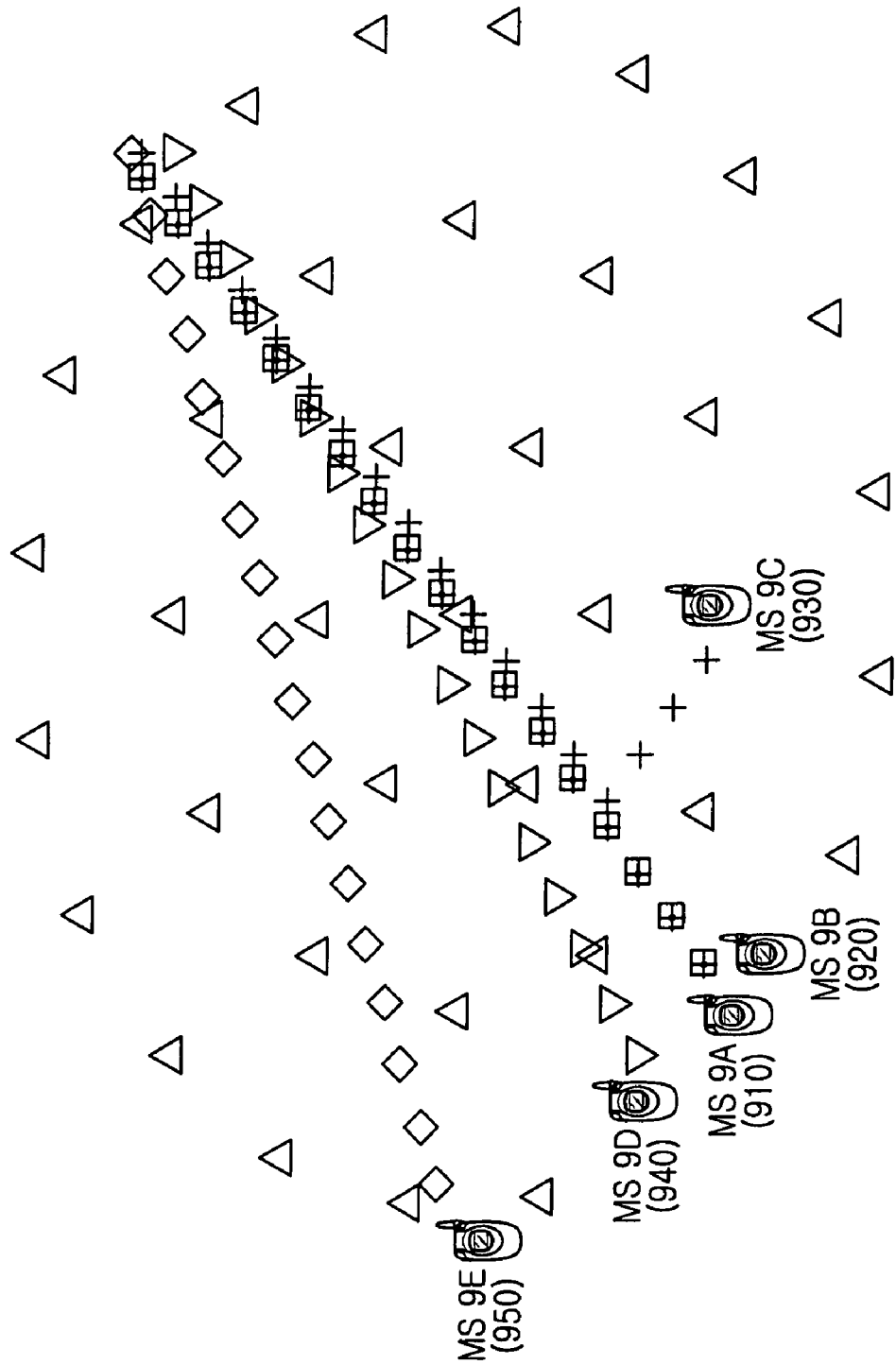
FIGS. 9A and 9B are views illustrating a simulation environment for computing a correlation value between mobile stations in a broadband wireless communication system according to the present invention.
Figure 9B:
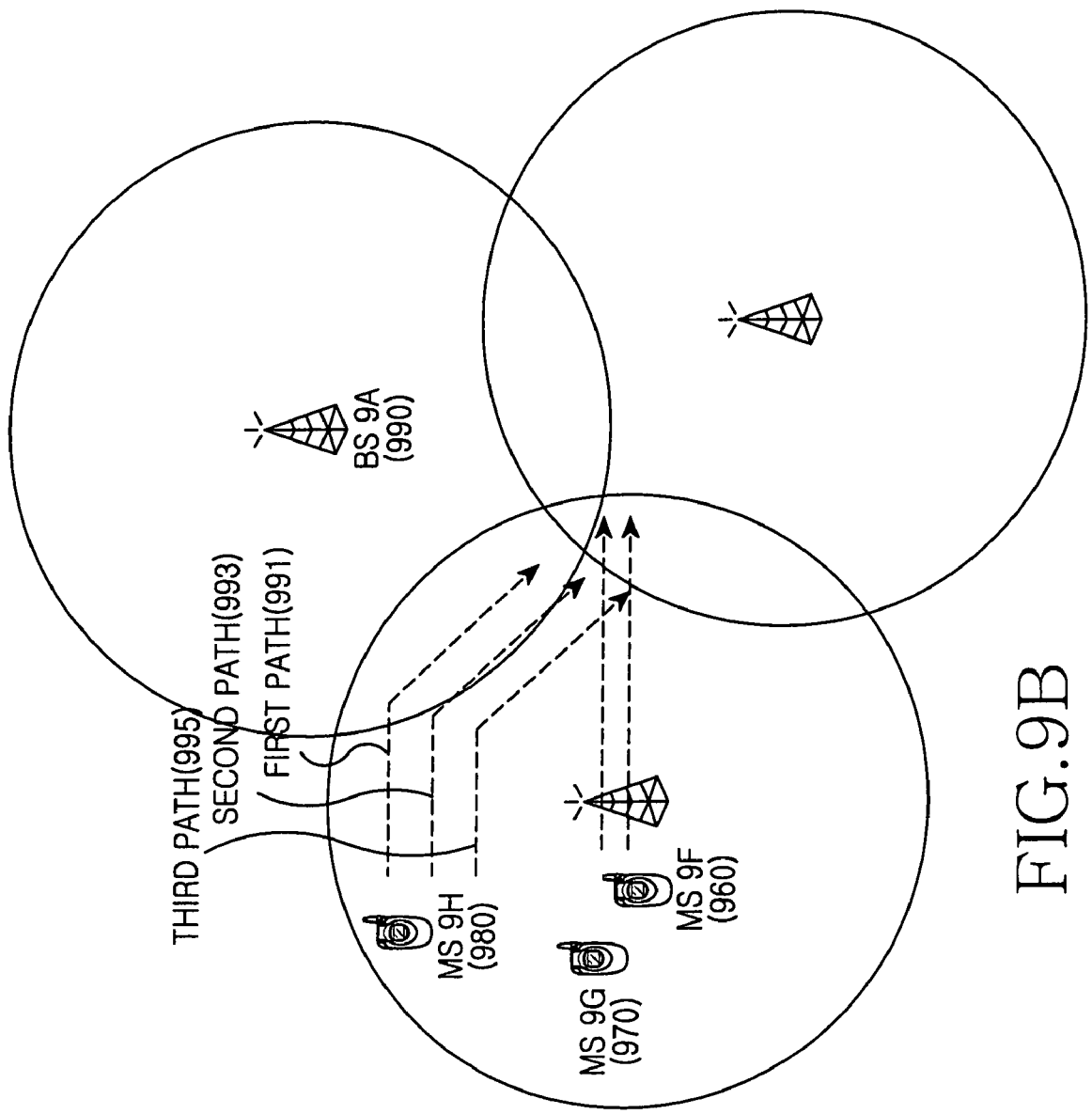

FIGS. 9A and 9B are views illustrating a simulation environment for computing a correlation value between mobile stations in a broadband wireless communication system according to the present invention.

FIG. 9A shows an environment in which a movement path correlation value is computed by using a history of the mobile stations. In FIG. 9A, a triangle represents a BS, and other symbols indicate a trace of a moving MS. Herein, a distance between base stations is 1 kilometer (km), a movement speed of each MS is 120 km/h, a history recording period TB of each MS is 20 seconds, and the number N B of BS indices used in correlation computation is 17. In this case, by using Equation 1 and Equation 2 above, a movement path correlation value between mobile stations is obtained as described in Table 1 below.

TABLE 1

|      | MS9A   | MS9B   | MS9C   | MS9D   | MS9E |
|------|--------|--------|--------|--------|------|
| MS9A | 0      | 0.1765 | 0.1765 | 0.1765 | ∞    |
| MS9B | 0.1765 | 0      | 0.3529 | 0.2353 | ∞    |
| MS9C | 0.1765 | 0.3529 | 0      | 0.3529 | ∞    |
| MS9D | 0.1765 | 0.2353 | 0.3529 | 0      | ∞    |
| MS9E | ∞      | ∞      | ∞      | ∞      | 0    |

In Table 1, an MS9A 910, an MS9B 920, an MS9C 930, and an MS9D 940 belong to the same group since movement path correlation values with respect to other mobile stations are significantly small, and an MS9E 950 does not belong to the same group since a movement path correlation value with respect to other mobile stations is infinite.

FIG. 9B shows an environment where a signal strength correlation value is computed by using a received signal strength of an MS. In FIG. 9B, a dotted line indicate a trace of a moving MS. It will be assumed herein that first grouping is performed so that an MS9F 960, an MS9G 970, and an MS9H 980 belong to the same group. When the MS9H 980 moves along a first path 991, a signal strength correlation value for a BS9A 990 is obtained by using Equation (3) above, as described in Table 2 below.

TABLE 2

|       | MS9F    | MS9G    | MS9H    |
|-------|---------|---------|---------|
| MS9F  | 0       | 1.3473  | 30.9787 |
| MS9G  | 1.3473  | 0       | 31.4278 |
| MS9H  | 90.9787 | 31.4278 | 0       |

When the MS9H 980 moves along a second path 993, a signal strength correlation value for the BS9A 990 is obtained as described in Table 3 below.

TABLE 3

|       | MS9F    | MS9G    | MS9H    |
|-------|---------|---------|---------|
| MS9F  | 0       | 0.2115  | 28.2703 |
| MS9G  | 0.2115  | 0       | 28.1998 |
| MS9H  | 28.2703 | 28.1998 | 0       |

When the MS9H 980 moves along a third path 995, a signal strength correlation value for the BS9A 990 is obtained as described in Table 4 below.

TABLE 4

|       | MS9F    | MS9G    | MS9H    |
|-------|---------|---------|---------|
| MS9F  | 0       | 0.4910  | 24.0032 |
| MS9G  | 0.4910  | 0       | 23.8395 |
| MS9H  | 24.0032 | 23.8395 | 0       |

As shown in Table 2, Table 3, and Table 5 above, the MS9F 960 and the MS9G 970 have a small signal strength correlation value, while the MS9H 980 has a great signal strength correlation value with respect to other mobile stations. Therefore, only the MS9F 960 and the MS9G 970 may be re-classified into one group.

According to the present invention, a hysteresis is controlled by predicting a handover time of an MS in a broadband wireless communication system. Therefore, it is possible to reduce a time for maintaining communication between the MS and a serving BS whose received signal strength is low, thereby improving quality of communication.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus of a base station for controlling a handover hysteresis of a mobile station in a broadband wireless communication system, the apparatus comprising:
    a grouping unit configured to group mobile stations by using information on a movement path of each mobile station and information on a received signal strength of a neighboring base station, thereby constituting at least one group;
    a controller configured to modify handover hystereses of remaining mobile stations among the mobile stations belonging to the same group, upon a determination that a predetermined number of mobile stations perform handovers; and
    a transmitter configured to transmit a message including modified handover hysteresis information to the remaining mobile stations belonging to the group.

2. The apparatus of claim 1, wherein the grouping unit is configured to perform a first grouping by computing a movement path correlation between the mobile stations according to the movement path and perform a second grouping on the mobile stations, which have undergone the first grouping, by computing a signal strength correlation between the mobile stations according to the received signal strength.

3. The apparatus of claim 2, wherein the grouping unit performs the first grouping so that mobile stations are classified into one group upon a determination that a result of the following equation is less than a specific threshold:

$$\frac{\sum_{n=1}^{N_B} D_{i,j}(t - T_B(n-1))}{N_B} \left( D_{i,j}(t) = \begin{cases} 0, & R_i(t) = R_j(t) \\ 1, & \text{else} \quad R_i(t) \text{ is adjacent to } R_j(t) \\ \infty, & \text{otherwise} \end{cases} \right),$$

where $N_B$ denotes the number of base station indices used to compute the movement path correlation, $T_B$ denotes a time period in which a movement path of a mobile station is recorded, $D_{i,j}(t)$ denotes a distance coefficient between a mobile station i and a mobile station j, and $R_i(t)$ denotes an index of a base station from which a mobile station receives a service at time t.

4. The apparatus of claim 2, wherein the grouping unit performs the second grouping so that mobile stations are classified into one group upon a determination that a result of the following equation is less than a specific threshold:

$$\frac{\sum_{A \in ActiveSet} \left| \sum_{n=1}^{N_S} [S_{i,A}(t - T_S(n-1)) - S_{j,A}(t - T_S(n-1))] \right|}{N_S \cdot N_{ActiveSet}},$$

where Si,A(t) denotes a received signal strength of an Ath base station, computed by the mobile station i at time t, TS denotes a time period in which a mobile station obtains information on a received signal strength of a neighboring base station, and NS denotes the number of pieces of received signal strength information transmitted by a mobile station for one time period.

5. The apparatus of claim 1, wherein the received signal strength of the neighboring base station is averaged received signal strength information that is fed back from the mobile stations.

6. The apparatus of claim 1, wherein the message comprises at least one of modified handover hysteresis information, target base station information, and modified hysteresis valid time information.

7. The apparatus of claim 1, wherein the wireless communication system is an Orthogonal Frequency Division Multiplexing (OFDM) system.

8. An apparatus of a mobile station for controlling a handover hysteresis in a broadband wireless communication system, the apparatus comprising:
    a receiver configured to receive a message including modified handover hysteresis information from a base station, the modified handover hysteresis information based on information associated with a movement path of each of a group of mobile stations; and
    a handover processor configured to perform a handover upon a determination that a received signal strength difference between a serving base station and a neighboring base station is greater than the modified handover hysteresis.

9. The apparatus of claim 8, wherein the message comprises at least one of modified handover hysteresis information, target base station information, and modified hysteresis valid time information.

10. The apparatus of claim 9, wherein the handover processor resets the handover hysteresis to a value before modification upon a determination that a handover is not performed until a modified hysteresis valid time elapses after the handover hysteresis is modified.

11. The apparatus of claim 9, further comprising:
a measuring unit configured to measure received signal strengths for the serving base station and the neighboring base station; and
a transmitter configured to average the received signal strengths for the neighboring base station for a predetermined period of time and transmit the averaged received signal strength information to the serving base station.

12. The apparatus of claim 8, wherein the wireless communication system is an Orthogonal Frequency Division Multiplexing (OFDM) system.

13. A method performed by a base station for controlling a handover hysteresis of a mobile station in a broadband wireless communication system, the method comprising:
grouping mobile stations by using information on a movement path of each mobile station and information on a received signal strength of a neighboring base station, thereby constituting at least one group;
modifying handover hystereses of remaining mobile stations among the mobile stations belonging to the same group, upon a determination that a predetermined number of mobile stations perform handovers; and
transmitting a message including modified handover hysteresis information to the remaining mobile stations belonging to the group.

14. The method of claim 13, wherein the step of grouping comprises:
performing a first grouping by computing a movement path correlation between the mobile stations according to the movement path: and
performing a second grouping on the mobile stations, which have undergone the first grouping, by computing a signal strength correlation between the mobile stations according to the received signal strength.

15. The method of claim 14, wherein the step of performing the first grouping comprises:
computing a movement path correlation value by using the following equation:

$$\frac{\sum_{n=1}^{N_B} D_{i,j}(t - T_B(n-1))}{N_B} \left( \begin{array}{l} D_{i,j}(t) = \\ \begin{cases} 0, & R_i(t) = R_j(t) \\ 1, & \text{else} \quad R_i(t) \text{ is adjacent to } R_j(t) \\ \infty, & \text{otherwise} \end{cases} \end{array} \right),$$

where NB denotes the number of base station indices used to compute the movement path correlation, TB denotes a time period in which a movement path of a mobile station is recorded, Di,j(t) denotes a distance coefficient between a mobile station i and a mobile station j, and Ri(t) denotes an index of a base station from which a mobile station receives a service at time t; and
classifying mobile stations into one group upon a determination that the movement path correlation value is less than a specific threshold.

16. The method of claim 14, further comprising:
computing a signal strength correlation value by using equation:

$$\frac{\sum_{A \in ActiveSet} \left| \sum_{n=1}^{N_S} [S_{i,A}(t - T_S(n-1)) - S_{j,A}(t - T_S(n-1))] \right|}{N_S \cdot N_{ActiveSet}},$$

where Si,A(t) denotes a received signal strength of an Ath base station, computed by the mobile station i at time t, TS denotes a time period in which a mobile station obtains information on a received signal strength of a neighboring base station, and NS denotes the number of pieces of received signal strength information transmitted by a mobile station for one time period; and
classifying mobile stations into one group upon a determination that the signal strength correlation value is less than a specific threshold.

17. The method of claim 13, wherein the received signal strength of the neighboring base station is averaged received signal strength information that is fed back from the mobile stations.

18. The method of claim 13, wherein the message comprises at least one of modified handover hysteresis information, target base station information, and modified hysteresis valid time information.

19. The apparatus of claim 13, wherein the wireless communication system is an Orthogonal Frequency Division Multiplexing (OFDM) system.

20. A method of controlling a handover hysteresis by a mobile station in a broadband wireless communication system, the method comprising the steps of:
receiving a message including modified handover hysteresis information from a base station;
modifying a handover hysteresis according to the information;
checking whether a received signal strength difference between a serving base station and a neighboring base station is greater than the modified hysteresis, the modified handover hysteresis based on information associated with a movement path of each of a group of mobile stations; and
performing a handover upon a determination that the received signal strength difference is greater than the modified handover hysteresis.

21. The method of claim 20, wherein the message comprises at least one of modified handover hysteresis information, target base station information, and modified handover hysteresis valid time information.

22. The method of claim 21, further comprising:
after modifying the hysteresis, checking whether the handover is not performed until the modified hysteresis valid time elapses; and
resetting the handover hysteresis to a value before modification.

23. The method of claim 20, further comprising:
measuring received signal strengths for the serving base station and the neighboring base station;
averaging the received signal strengths for the neighboring base station for a predetermined period of time; and
transmitting the averaged received signal strength information to the serving base station.

24. The apparatus of claim 20, wherein the wireless communication system is an Orthogonal Frequency Division Multiplexing (OFDM) system.

* * * * *